United States Patent
Xu et al.

(10) Patent No.: US 8,190,915 B2
(45) Date of Patent: May 29, 2012

(54) METHOD AND APPARATUS FOR DETECTING DATA TAMPERING WITHIN A DATABASE

(75) Inventors: Mingkang Xu, Fremont, CA (US); Daniel ManHung Wong, Sacramento, CA (US)

(73) Assignee: Oracle International Corporation, Redwood Shores, CA (US)

(*) Notice: Subject to any disclaimer, the term of this patent is extended or adjusted under 35 U.S.C. 154(b) by 1136 days.

(21) Appl. No.: 11/454,170

(22) Filed: Jun. 14, 2006

(65) Prior Publication Data
US 2007/0294205 A1    Dec. 20, 2007

(51) Int. Cl.
*G06F 12/14* (2006.01)
(52) U.S. Cl. .................. 713/193; 707/697; 707/698
(58) Field of Classification Search .................. 713/193, 713/177, 181, 176, 189; 707/1, 4, 7, 10, 707/102, 104.1, 101, 200, 202, 687, 690, 707/693, 697, 698, 699, 747; 726/26–30; 380/277–279, 282, 285
See application file for complete search history.

(56) References Cited

U.S. PATENT DOCUMENTS

| | | | | |
|---|---|---|---|---|
| 5,511,190 A * | 4/1996 | Sharma et al. | ........................ | 1/1 |
| 5,860,070 A * | 1/1999 | Tow et al. | ........................ | 707/8 |
| 5,903,651 A * | 5/1999 | Kocher | ........................ | 713/158 |
| 6,144,745 A * | 11/2000 | Akiyama et al. | ........................ | 380/232 |
| 6,868,406 B1 * | 3/2005 | Ogg et al. | ........................ | 705/60 |
| 6,959,384 B1 * | 10/2005 | Serret-Avila | ........................ | 713/176 |
| 7,069,443 B2 * | 6/2006 | Berringer et al. | ........................ | 713/180 |
| 7,093,137 B1 * | 8/2006 | Sato et al. | ........................ | 713/193 |
| 7,136,861 B1 * | 11/2006 | Sinclair et al. | ........................ | 1/1 |
| 7,152,165 B1 * | 12/2006 | Maheshwari et al. | ........................ | 713/193 |
| 7,181,016 B2 * | 2/2007 | Cross et al. | ........................ | 380/281 |
| 7,424,621 B2 * | 9/2008 | Riches et al. | ........................ | 713/193 |
| 2003/0084298 A1 * | 5/2003 | Messerges et al. | ........................ | 713/176 |
| 2004/0054901 A1 * | 3/2004 | England et al. | ........................ | 713/168 |
| 2004/0220975 A1 * | 11/2004 | Carpentier et al. | ........................ | 707/200 |
| 2005/0114666 A1 * | 5/2005 | Sudia | ........................ | 713/175 |
| 2006/0129847 A1 * | 6/2006 | Pitsos | ........................ | 713/193 |
| 2006/0288232 A1 * | 12/2006 | Ho et al. | ........................ | 713/185 |

* cited by examiner

*Primary Examiner* — Nirav B. Patel
(74) *Attorney, Agent, or Firm* — Shun Yao; Park, Vaughan, Fleming & Dowler LLP

(57) ABSTRACT

One embodiment of the present invention provides a system that facilitates detecting data tampering within a table in a database. The system operates by hashing a row in the table to create a row-hash. The system then hashes a block of consecutive row-hashes to create a block-hash. Finally, the system signs the block-hash with an encryption key, so that tampering with data in the row will result in an invalid row-hash and an invalid block-hash.

20 Claims, 3 Drawing Sheets

METHOD AND APPARATUS FOR DETECTING DATA TAMPERING WITHIN A DATABASE

BACKGROUND

1. Field of the Invention

The present invention relates to databases. More specifically, the present invention relates to a method and an apparatus for detecting data tampering within a database.

2. Related Art

Many companies and organizations store important data in databases, and security of this data is a vitally important concern. Databases provide various features to protect this data, including authentication, authorization and auditing. In order to be authenticated, users typically need to validate their identity before they can connect to the database. Furthermore, once they are authenticated, they are typically only allowed to access the data that they have been granted privileges to access. Finally, operations that the user performs are typically audited for various purposes.

The above-described features are typically sufficient for most users; however, there are two types of users who can change or delete the data, and the above model does not apply to them. The first type of user is the privileged database user. Privileged database users typically have access to all the data in the database, and can perform any operation they want within the database. The second type of users is the privileged Operating System (OS) user. Since the database files reside on a file system, these privileged OS users can bypass the database access controls and modify the database files directly.

To mitigate the above-described problems, database administrators can limit the number of privileged users for the database, or can otherwise tighten control over accounts for these privileged users. However, in some critical systems like financial databases or audit databases, this is not sufficient. Recent compliance regulation changes, such as the Sarbanes-Oxley Act, require companies to prevent tampering with sensitive data.

Hence, what is needed is a method and an apparatus for securing data in a database system in a manner that is tamper-evident without the problems listed above.

SUMMARY

One embodiment of the present invention provides a system that facilitates detecting data tampering within a table in a database. The system operates by hashing a row in the table to create a row-hash. The system then hashes a block of consecutive row-hashes to create a block-hash. Finally, the system signs the block-hash with an encryption key, so that tampering with data in the row will result in an invalid row-hash and an invalid block-hash.

In a variation of this embodiment, hashing the block involves hashing a signature of a previous block-hash along with the block of consecutive row-hashes to facilitate the detection of missing blocks.

In a variation of this embodiment, the block-hash is stored in the table.

In a variation of this embodiment, the row-hash is stored in the corresponding row.

In a variation of this embodiment, the table is an insert-only table. This means data may only be inserted into the table, and no user, including an administrator, may delete or update data which is inserted into the table.

In a variation of this embodiment, signing the block-hash with an encryption key involves signing the block-hash with a private-key of a Public Key Infrastructure (PKI) key pair.

In a further variation, the private-key is stored in an External Security Module (ESM).

In a further variation, the private-key is held by a third-party.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a non-transitory computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Overview

Figure 1:
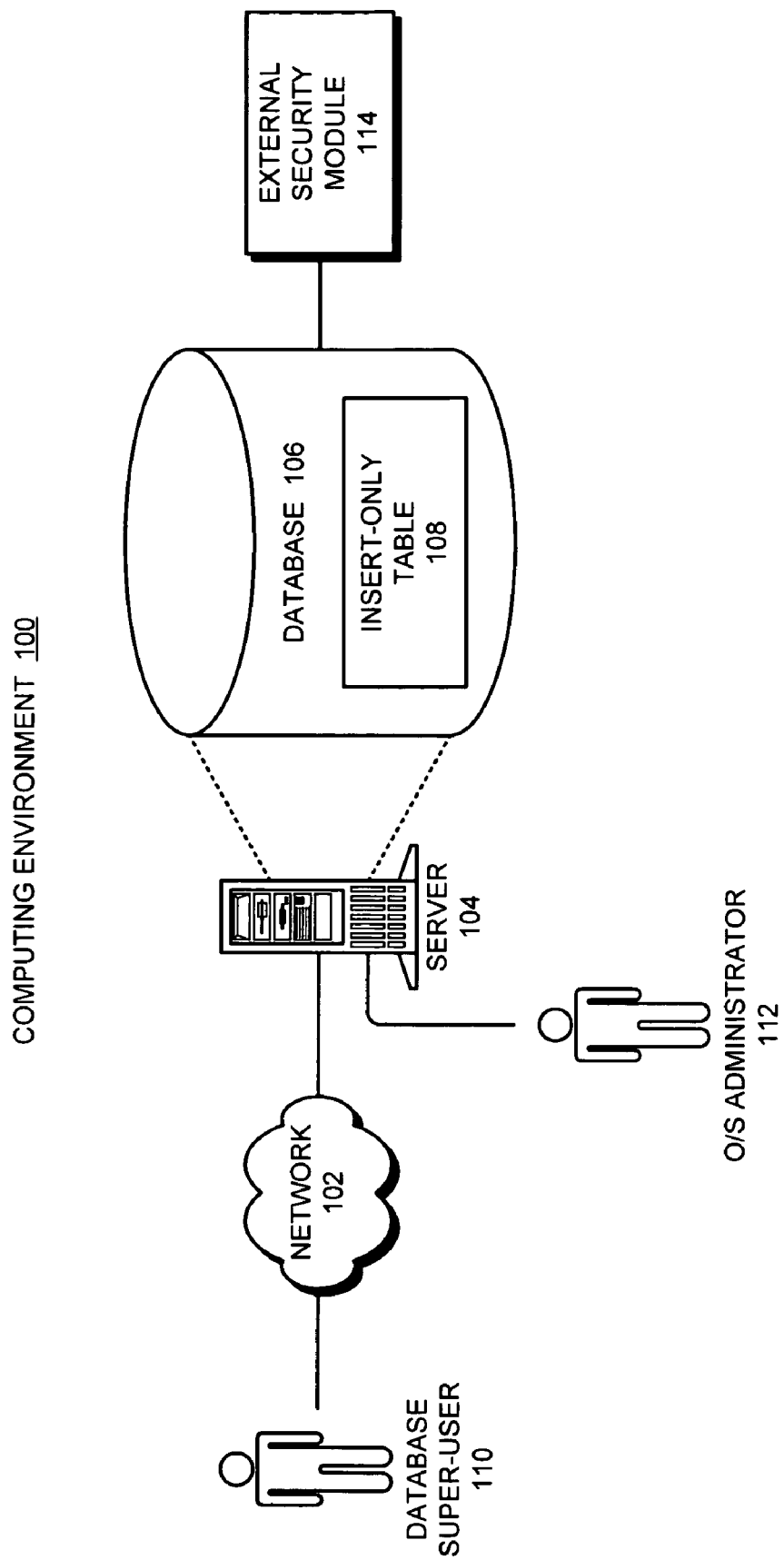
FIG. 1 illustrates a computing environment in accordance with an embodiment of the present invention.

FIG. 1 illustrates a computing environment 100 in accordance with an embodiment of the present invention. Computing environment 100 includes network 102, server 104, database super-user 110 and Operating System (OS) administrator 112.

Network 102 can generally include any type of wired or wireless communication channel capable of coupling together computing nodes. This includes, but is not limited to, a local area network, a wide area network, or a combination of networks. In one embodiment of the present invention, network 102 includes the Internet.

Database 106 is coupled to server 104. Database 106 can include any type of system for storing data in non-volatile storage. This includes, but is not limited to, systems based upon magnetic, optical, and magneto-optical storage devices, as well as storage devices based on flash memory and/or battery-backed up memory. Note that for illustrative purposes, database 106 resides within a server 104. However, database 106 can generally reside on any computing platform or appliance with computing environment 100.

Database 106 includes insert-only table 108. Data may only be inserted into insert-only table 108, and no user, including an administrator or super-user, such as database super-user 110, may delete or update data which was inserted into insert-only table 108.

Computing environment 100 also includes External Security Module (ESM) 114. ESM 114 can be part of, or physically attached to, server 104, or optionally, may be located in a different physical location than server 104. In one embodiment of the present invention, ESM 114 is physically located at the facilities of a third party, and is accessible to database 106 via network 102. In addition, ESM 104 may be a software security module or a hardware security module.

One embodiment of the present invention facilitates storage of sensitive data in a tamper-evident environment. Note that all of the embodiments described in the present application refer to insert-only tables, such as insert-only table 108. However, one embodiment may include standard insert/update/delete database tables, as long as the hashes and signatures of the rows and blocks described below are stored in a secure environment.

In one embodiment of the present invention, as data is inserted into rows in insert-only table 108, the system creates a hash of each row. Note that these hashes may be stored in the corresponding rows along with the data, or may optionally be stored in an alternate location. In one embodiment, each row-hash is stored in its corresponding row in insert-only table 108 to facilitate validation by users and applications.

In one embodiment of the present invention, the system groups a block of consecutive rows, and creates a block-hash of the individual row-hashes. After creating the block-hash, the system signs the block-hash with an encryption key and stores the block-hash in insert-only table 108. Note that creating and signing the block-hash takes less time than signing each individual row-hash. However, in a variation on this embodiment, the system signs each individual row-hash. Also note that in one embodiment of the present invention, all hashes are stored in a separate table and not in insert-only table 108.

Note that the number of rows that are in a block is completely arbitrary. The system could include every x number of rows in a block, or could include every row inserted in a specified time period t in a block. Also note that the embodiment described suggests consecutive rows are included in a block. However, it is possible for variations on this embodiment to include non-consecutive rows in a block, as long as each row that requires tamper-evidence is hashed or included in a hash.

In one embodiment of the present invention, the system signs the block-hash with the private key of a Public Key Infrastructure (PKI) key pair. Note that a symmetric key may be used, but then the key would need to be protected to prevent data-tampering. In a variation on this embodiment, ESM 114 performs the hash signing, and the private key is never revealed outside of ESM 114. Furthermore, the public key may be made readily available to users and applications to verify the integrity of the data in insert-only table 108.

Note that hashing and signing blocks in an insert-only environment protects the data in a manner such that data-tampering would be readily apparent. However, if an OS administrator or super-user, such as OS administrator 112, modified the database files at the OS level directly, it is possibly for the OS administrator 112 to delete an entire block of data from insert-only table 108. In one embodiment of the present invention, the deletion of entire blocks can be easily identified by including the signature of a block-hash in subsequent block-hashes, thus creating a block-hash chain. If one block is deleted from the chain, the block-hash calculated using the signature of the previous block no longer matches.

If at any time there is an indication that a key has been compromised, it is possible to have the system obtain a new key. In one embodiment of the present invention, such an indication would result in an immediate audit of the existing data to determine as best as possible if any data has been tampered with. Note that this would have to be carried out using the compromised key. All of the data would then be re-hashed following the previously described method using the new key.

In one embodiment of the present invention, keys are assigned on a per-database level. In a variation on this embodiment, each table in database 106 is assigned a unique key.

In a variation on this embodiment, the system may perform block hashing and signing as described above as the data is entered, and then re-hash and sign each individual row during a subsequent idle time, or when system resources fall below a pre-determined threshold.

Tamper-Evident Table

Figure 2:
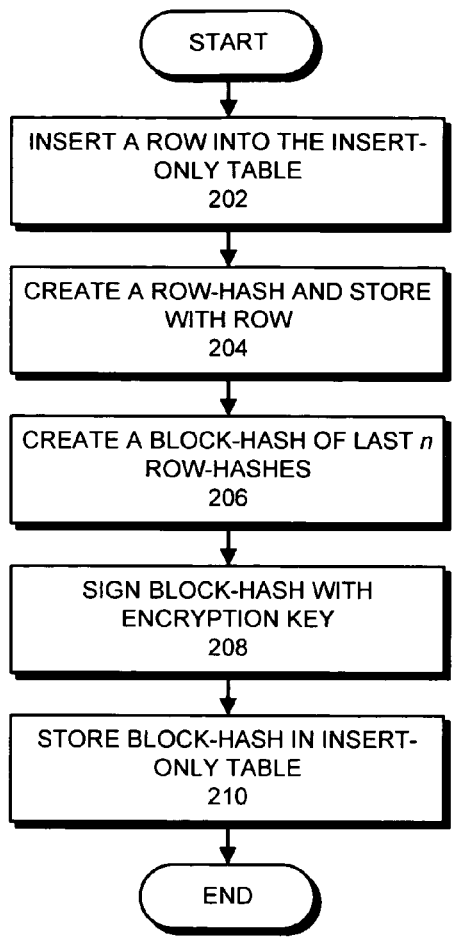
FIG. 2 presents a flowchart illustrating the process of adding rows to a tamper-evident table in accordance with an embodiment of the present invention.

FIG. 2 presents a flowchart illustrating the process of adding rows to a tamper-evident table in accordance with an embodiment of the present invention. The system starts when a row is inserted into insert-only table 108 (step 202). The system then creates a row-hash and stores the row-hash with the row in insert-only table 108 (step 204). Next, the system creates a block-hash of the last n row-hashes, where n could be a pre-determined number, or a variable number, such as the number of rows inserted into insert-only table 108 in a specified time period (step 206). The system then signs the block-hash with an encryption key (step 208). Finally, the system stores the block-hash in the insert-only table 108 (step 210).

Tamper-Evident Table with Hash-Chaining

Figure 3:
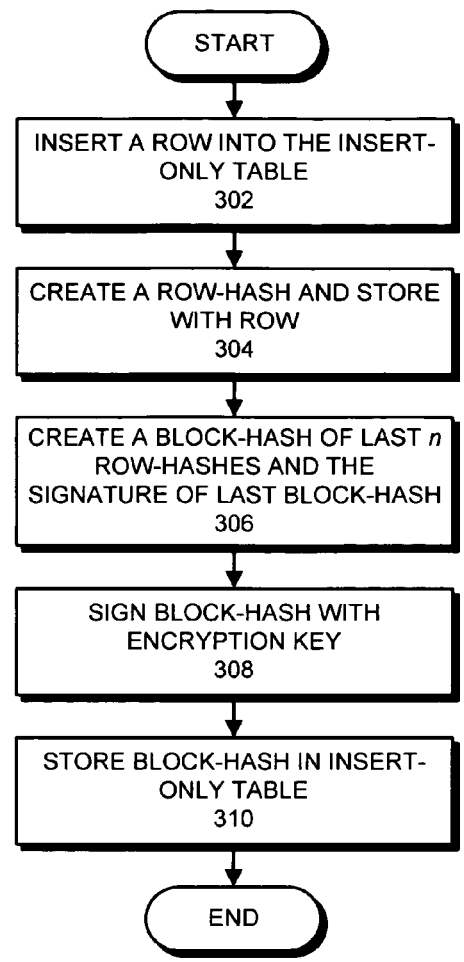
FIG. 3 presents a flowchart illustrating the process of adding rows to a tamper-evident table with hash-chaining in accordance with an embodiment of the present invention.

FIG. 3 presents a flowchart illustrating the process of adding rows to a tamper-evident table with hash-chaining in accordance with an embodiment of the present invention. The system starts when a row is inserted into insert-only table 108 (step 302). The system then creates a row-hash and stores the row-hash with the row in insert-only table 108 (step 304). Next, the system creates a block-hash of the last n row-hashes and the signature of the previous block-hash to facilitate the detection of missing blocks (step 306). The system then signs the block-hash with an encryption key (step 308). Finally, the system stores the block-hash in the insert-only table 108 (step 310).

Determining if a Row has been Tampered

Figure 4:
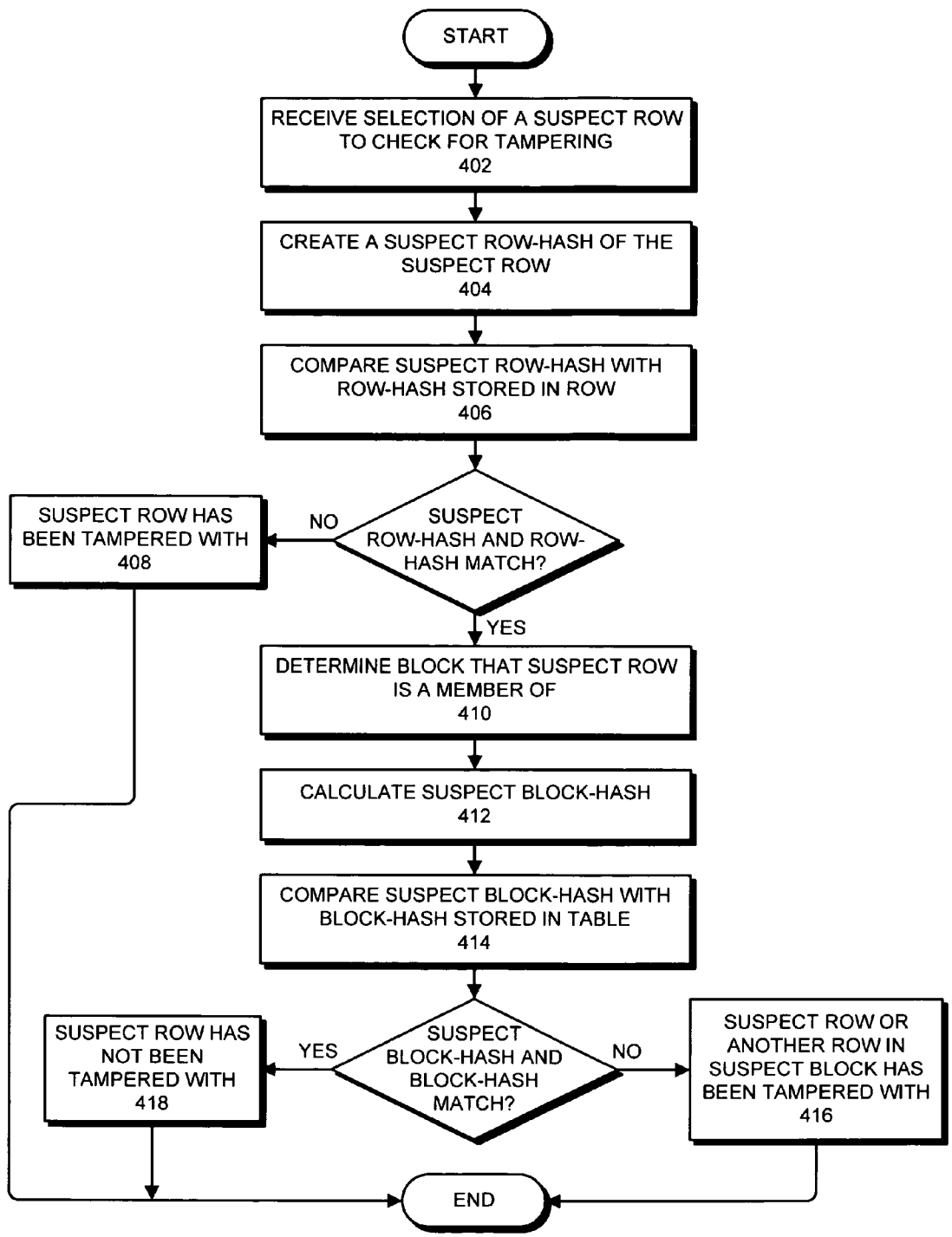
FIG. 4 presents a flowchart illustrating the process of determining if a row has been tampered in accordance with an embodiment of the present invention.

FIG. 4 presents a flowchart illustrating the process of determining if a row has been tampered in accordance with an embodiment of the present invention. The system starts by receiving a selection of a suspect row to check for tampering (step 402). Note that this selection can come from a routine audit, a compliance audit, or some other indication that the data may have been compromised. Next, the system creates a suspect row-hash of the suspect row using the same hashing technique that was used to create the original row-hash that is stored in the row in insert-only table 108 (step 404). Note that if each individual row-hash was signed, then the system also signs the suspect row-hash with the same encryption key used in the signing of the original row-hash.

Once the suspect row-hash has been created, the system compares the suspect row-hash and the original row-hash stored in the row in insert-only table 108 to determine if they match (step 406). If not, data in the suspect row has been tampered with, and the system reports the results (step 408). Note that this may also include spawning alternate audit or tamper-verification processes.

If the suspect row-hash and the original row-hash do match, the system determines the block that the suspect row is a member of (step 410). Once the block membership is known, the system then calculates a suspect block-hash of the suspect block using the same hashing technique that was used to create the original block-hash that is stored in insert-only table 108 (step 412).

Once the suspect block-hash has been created, the system compares the suspect block-hash and the original block-hash stored in insert-only table 108 to determine if they match (step 414). If not, data in the suspect block has been tampered with, and the system reports the results (step 416). Note that this could include the suspect row, or another row in the suspect block, or all of the rows in the suspect block. If the suspect block-hash and the original block-hash do not match, the system can optionally check each row in the suspect block to further determine the row in the suspect block that was compromised. Note that if the original block-hash was signed, then the system also decrypts the original signed block-hash with the same encryption key used in the signing of the original block-hash if a symmetric key was used, or with the corresponding public key if a PKI key pair was used.

In a variation on this embodiment, in order to detect if the last block was deleted, the system additionally stores the signature of the last block-hash in a secure place, such as with a third party, or within ESM 114. In this embodiment, if a privileged OS user deletes the trailing data, this deletion can be detected by comparing the final signature with the stored signature of the last block-hash.

Note that if the above-mentioned chain-linking was used where the signature of the previous block is included in the hash of the current block, then the non-matching suspect block and original block can also indicate that an entire previous block of rows has been deleted, and further investigation may be required.

If the suspect block-hash and the original block-hash do match, then the row has not been tampered with.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method comprising:
selecting a suspect row in a database table to check for tampering;
determining, by a computer, that the suspect row has not been tampered with, which involves:
generating a suspect row hash for the suspect row; and
comparing the suspect row hash with a stored row hash for the suspect row;
determining a suspect block for the suspect row, wherein the suspect block includes a group of rows in the database table, and wherein the group of rows includes the suspect row;
generating a first block hash for the suspect block by performing a hash function on both the individual row hashes of the group of rows and a signature for a previous block hash, wherein the previous block hash includes a block hash for a group of rows that precedes the suspect block in the database table; and
comparing the first block hash to a corresponding stored block hash for the suspect block; and
in response to determining that the first block hash does not match the stored block hash for the suspect block, determining whether a row other than the suspect row in the suspect block has been tampered with.

2. The method of claim 1, wherein the stored first block hash is stored in the table.

3. The method of claim 1, wherein at least one of the row hashes is stored in the corresponding row.

4. The method of claim 1, wherein data may only be inserted into the table, and wherein no user, including an administrator, may delete or update data which is inserted into the table.

5. The method of claim 1, wherein generating the first block involves signing the first block hash with a private-key of a Public Key Infrastructure (PKI) key pair.

6. The method of claim 5, wherein the private-key is stored in an External Security Module (ESM).

7. The method of claim 5, wherein the private-key is held by a third-party.

8. The method of claim 1, further comprising:
in response to determining that none of the rows in the suspect block has been tampered with, determining whether one or more rows have been deleted from the block that precedes the suspect block in the database table.

9. A non-transitory computer-readable storage medium storing instructions that when executed by a computer cause the computer to perform a method, the method comprising:
selecting a suspect row in a database table to check for tampering;
determining that the suspect row has not been tampered with, which involves:
generating a suspect row hash for the suspect row; and
comparing the suspect row hash with a stored row hash for the suspect row;
determining a suspect block for the suspect row, wherein the suspect block includes a group of rows in the database table, and wherein the group of rows includes the suspect row;
generating a first block hash for the suspect block by performing a hash function on both the individual row hashes of the group of rows and a signature for a previous block hash, wherein the previous block hash includes a block hash for a group of rows that precedes the suspect block in the database table; and
comparing the first block hash to a corresponding stored block hash for the suspect block; and
in response to determining that the first block hash does not match the stored block hash for the suspect block, determining whether a row other than the suspect row in the suspect block has been tampered with.

10. The non-transitory computer-readable storage medium of claim 9, wherein the stored block hash is stored in the table.

11. The non-transitory computer-readable storage medium of claim 9, wherein a row hash for at least one row of the database table is stored in the corresponding row.

12. The non-transitory computer-readable storage medium of claim 9, wherein data may only be inserted into the table, and wherein no user, including an administrator, may delete or update data which is inserted into the table.

13. The non-transitory computer-readable storage medium of claim 9, wherein generating the first block hash involves signing the first block hash with a private-key of a Public Key Infrastructure (PKI) key pair.

14. The non-transitory computer-readable storage medium of claim 13, wherein the private-key is stored in an External Security Module (ESM).

15. The non-transitory computer-readable storage medium of claim 13, wherein the private-key is held by a third-party.

16. The non-transitory computer-readable storage medium of claim 9, the method further comprising:

in response to determining that none of the rows in the suspect block has been tampered with, determining whether one or more rows have been deleted from the block that precedes the suspect block in the database table.

17. An apparatus configured to detect data tampering within a database table in a database, comprising:

a processor;

a data-storage device;

a selection mechanism configured to select a suspect row in a database table to check for tampering;

a validation mechanism configured to determine that the suspect row has not been tampered with, wherein the determining involves:

generating a suspect row hash for the suspect row; and comparing the suspect row hash with a stored row hash for the suspect row;

a determination mechanism configured to determine a suspect block for the suspect row, wherein the suspect block includes a group of rows in the database table, and wherein the group of rows includes the suspect row; and a block-hashing mechanism configured to generate a first block hash for the suspect block by performing a hash function on both the individual row hashes of the block of rows and a signature for a previous block hash, wherein the previous block hash includes a block hash for a block of rows that precedes the suspect block in the database table; and comparing the first block hash to a corresponding stored block hash for the suspect block; and wherein the validation mechanism is further configured to determine whether a row other than the suspect row in the suspect block has been tampered with in response to determining that the first block hash does not match the stored block hash.

18. The apparatus of claim 17, wherein the first block-hashing mechanism further stores the stored block hash in the table.

19. The apparatus of claim 17, wherein the row-hashing mechanism further stores a row hash for at least one row of the database table in the corresponding row.

20. The apparatus of claim 17, wherein the validation mechanism is further configured to determine whether one or more rows have been deleted from the block that precedes the suspect block in the database table in response to determining that none of the rows in the suspect block has been tampered with.

* * * * *

UNITED STATES PATENT AND TRADEMARK OFFICE
CERTIFICATE OF CORRECTION

PATENT NO. : 8,190,915 B2  
APPLICATION NO. : 11/454170  
DATED : May 29, 2012  
INVENTOR(S) : Xu et al.

Page 1 of 1

It is certified that error appears in the above-identified patent and that said Letters Patent is hereby corrected as shown below:

In the Specification

In column 2, line 39-40, after "device" delete "or medium".

In the Claims

In column 6, line 3, in Claim 2, after "stored" delete "first".

In column 6, line 12, in Claim 5, after "block" insert -- hash --.

Signed and Sealed this
Twenty-second Day of September, 2015

Michelle K. Lee
*Director of the United States Patent and Trademark Office*